June 20, 1939.  A. HORVATH  2,163,378
ARTIFICIAL FISH LURE
Filed Jan. 3, 1938
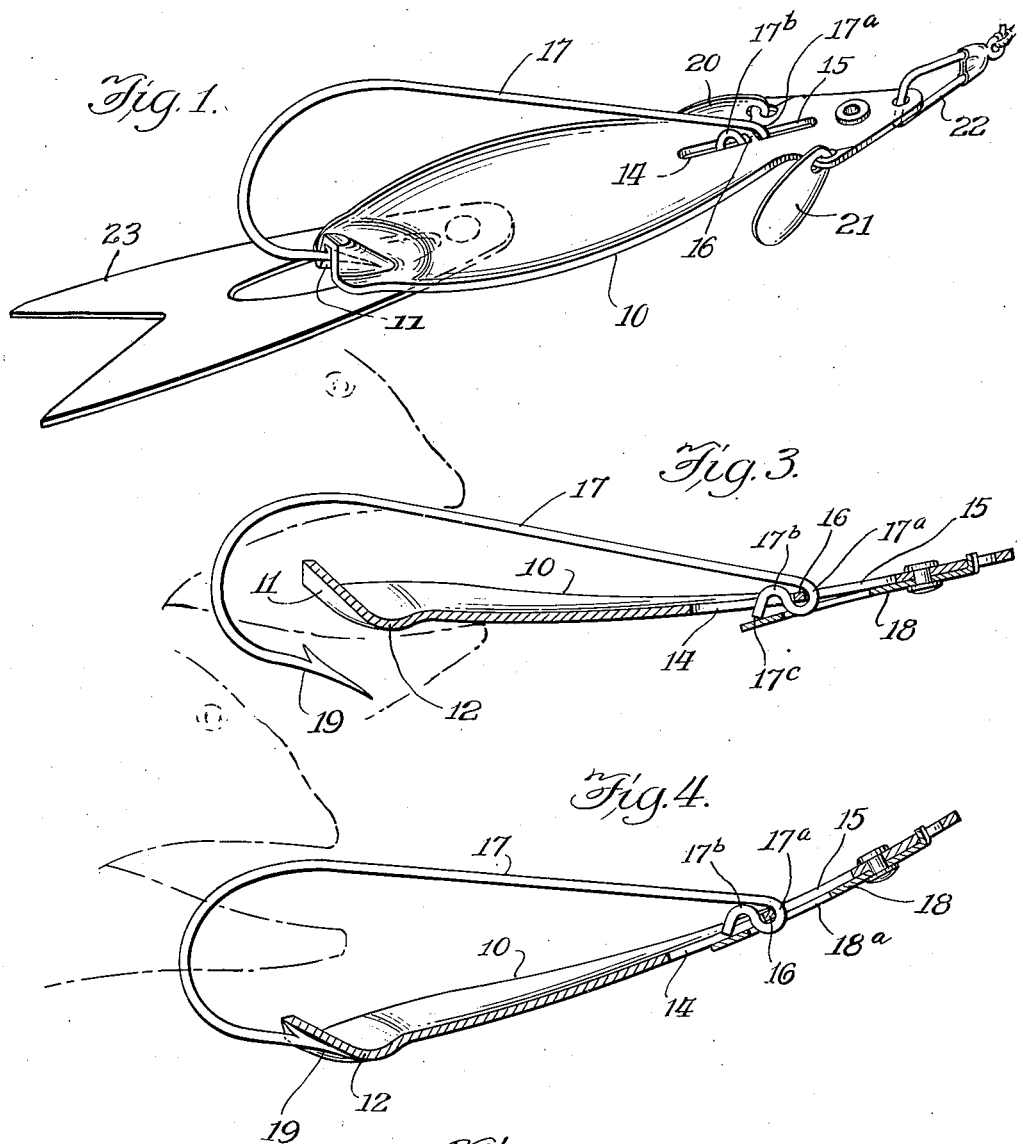
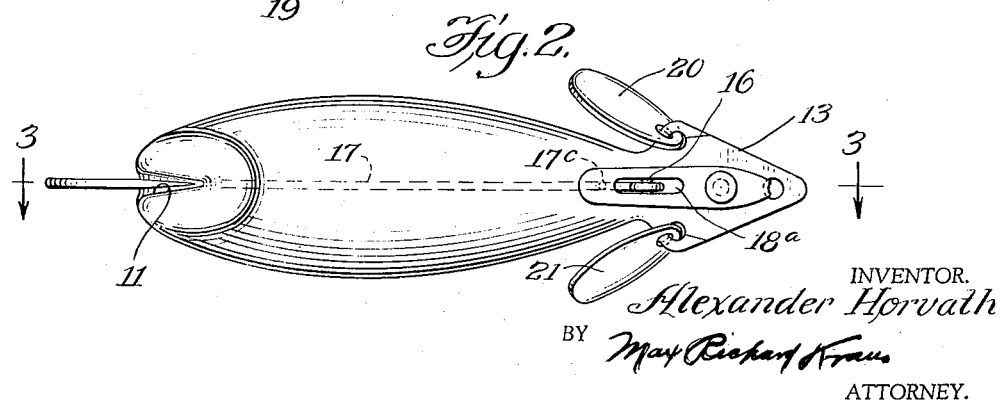
INVENTOR.
Alexander Horvath
BY
ATTORNEY.

Patented June 20, 1939

2,163,378

UNITED STATES PATENT OFFICE 2,163,378

ARTIFICIAL FISH LURE

Alexander Horvath, Chicago, Ill.

Application January 3, 1938, Serial No. 182,967

3 Claims. (Cl. 43—39)

This invention relates to an artificial fish lure and has for its object to provide a fish lure which in appearance resembles a minnow and which will move wigglingly as it is drawn through the water.

Another object of my invention is to provide a fish lure in which the piercing end of the fish hook is normally in a concealed position so as to be hidden from the view of the fish and also so as to prevent any entanglement with weeds or the like.

Another object of my invention is to provide a fish lure in which the fish hook closes immediately upon baiting of the fish and which further tends to resist opening as the fish is tugging at the line.

Another object is to provide a fish lure which is prompt and positive in action and which is very efficient in operation.

Other objects will become apparent as this description progresses.

In the drawing:

Fig. 1 is a perspective view of my fish lure in normal position;

Fig. 2 is a plan view taken from the bottom of the lure;

Fig. 3 is a view partly in cross section taken on the line 3—3 of Fig. 2, showing the position of the hook as it is first engaged by the fish;

Fig. 4 is a view similar to Fig. 3 but showing the position of the hook after the piercing end has passed through the lower jaw of the fish.

As shown in the drawing my fish lure comprises a concavo-convex plate or spoon 10 which is polished or painted with a reflecting material on the convex surface thereof to produce an attraction for the fish as the lure is drawn through the water. On the rear end of the plate there is stamped or formed an inclined pocket or depression 11 which serves as a seat for the piercing end of the hook presently to be described. Stamped in the plate adjacent said pocket is an embossed or depending surface 12 which extends below the plane of the convex surface of the plate. The plate 10 is narrowed progressively towards the front, and then tapers out and then converges to provide a pointed head 13. In the plate 10, I provide a pair of cutout portions 14 and 15 separated by a bridge member 16. Secured to said plate is a fish hook generally indicated at 17, the rear end of the hook being bent as at 17a to pass through the cutout portion 15 and upwardly around the bridge and into the cutout 14 to form an eyelet, and then further bent upon itself as at 17b, to terminate as at 17c. Secured to the head 13 by a suitable rivet is a spring plate 18 which is provided with a longitudinal slot 18a in which the bent portion 17a of the hook depends. The spring plate 18 bears against the end 17c of the hook so as to normally maintain the hook in its raised position as shown in Figures 1 and 4. The opposite end of the hook is bent downwardly and terminates in a barbed piercing end, 19. In the normal position of the fish lure with the plate 18 bearing against the end 17c of the hook, the piercing end 19 seats within the inclined pocket or depression 11 and is concealed from the view of the fish and protected from any entanglements with weeds or the like. As shown in Figures 1 and 4 with the hook in its normal position there is no break, opening or spacing between the plate and the hook. It will be understood that an unbarbed piercing end can be used with equal effectiveness in lieu of the barbed end 19 as shown in the drawing.

Formed in the head 13 of the plate are a pair of openings in which are received spinners or teardrop shaped plates 20 and 21, which have concavo-convex surfaces. These spinners are polished similar to the convex surface of the plate 10 and are adapted to assume a longitudinal position adjacent the plate when the plate is drawn through the water. The spinners tend to produce a wiggling effect of the fish lure as it is drawn through the water and combines with the head 13 to present the appearance of the head and gills of a minnow. Also provided in the head is an opening to which is secured the line connection 22.

Secured to the rear of the plate 10 by a suitable rivet is a rubber strip 23, which has the appearance of a pork rind. As the fish bites the lure with its upper jaw passing over the top of the hook and the lower jaw around the bottom of the plate approximately around the bossing, the fish hook will move downwardly with the piercing end 19 moving out of the pocket 11 to pierce through the lower cartilage of the fish. The tension of the plate 18 will promptly spring the hook back into its pocket seat to prevent the fish from freeing itself therefrom. As the fish tugs at the line, the piercing end will more firmly be seated within the pocket to positively prevent any release of the fish from the hook.

It is understood that various modifications and changes can be made without departing from the spirit and scope of my invention.

What I desire to secure by Letters Patent is:

1. An artificial lure comprising a concavo-convex plate having an embossed portion at one end thereof, a pocket formed in said embossed portion, a hook provided with a piercing point pivotally mounted in the opposite end of said plate, said piercing point being arranged to lie completely within said pocket, and a flat spring secured to said plate and arranged to engage the terminal end of said hook to retain said piercing point in said pocket.

2. In an artificial lure, a concavo-convex plate having an embossed end portion, a pocket formed therein longitudinally of said plate, a hook pivotally mounted in the opposite end of said plate and extending over the concave portion thereof, said hook being provided with a piercing point which is arranged to lie completely within said pocket, and a flat spring arranged to bear against the end of said hook to retain said piercing point in said pocket.

3. In an artificial lure, a concavo-convex plate having a slot at one end thereof, a hook mounted in said slot and provided with a piercing point, en embossed portion at the other end of said plate, a pocket formed in said embossed portion, said pocket being arranged to receive said piercing point, and a flat spring mounted over said slot and arranged to bear against the pivot end of said hook to retain said piercing point in said pocket.

ALEXANDER HORVATH.